United States Patent
Bodell et al.

(10) Patent No.: US 10,332,514 B2
(45) Date of Patent: *Jun. 25, 2019

(54) USING MULTIPLE MODALITY INPUT TO FEEDBACK CONTEXT FOR NATURAL LANGUAGE UNDERSTANDING

(71) Applicant: Microsoft Technology Licensing, LLC, Redmond, WA (US)

(72) Inventors: Michael Bodell, Santa Clara, CA (US); John Bain, Federal Way, CA (US); Robert Chambers, Sammamish, WA (US); Karen M. Cross, Santa Barbara, CA (US); Michael Kim, Sunnyvale, CA (US); Nick Gedge, Redmond, WA (US); Daniel Frederick Penn, Sammamish, WA (US); Kunal Patel, Sammamish, WA (US); Edward Mark Tecot, Sunnyvale, CA (US); Jeremy C. Waltmunson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/436,437

(22) Filed: Feb. 17, 2017

(65) Prior Publication Data
US 2017/0169824 A1    Jun. 15, 2017

Related U.S. Application Data

(63) Continuation of application No. 13/219,891, filed on Aug. 29, 2011, now Pat. No. 9,576,573.

(51) Int. Cl.
*G10L 15/00* (2013.01)
*G10L 15/22* (2006.01)
*G10L 15/26* (2006.01)

(52) U.S. Cl.
CPC ............ *G10L 15/22* (2013.01); *G10L 15/265* (2013.01); *G10L 2015/227* (2013.01); *G10L 2015/228* (2013.01)

(58) Field of Classification Search
CPC ......... G10L 15/00; G10L 15/08; G10L 15/14; G10L 15/063; G10L 15/18;
(Continued)

(56) References Cited

U.S. PATENT DOCUMENTS 7,027,974 B1    4/2006   Busch et al.
7,209,880 B1 *  4/2007   Gajic .................. G10L 15/07
                                                        704/200

(Continued)

OTHER PUBLICATIONS

Eccher, C., et al., Proceedings entitled "On the Usage of Automatic Voice Recognition in an Interactive Web Based Medical Application," presented at the IEEE International Conference 2003; Published Apr. 6-10, 2003; 4 pages.

(Continued)

*Primary Examiner* — Paras D Shah

(57) ABSTRACT

Input context for a statistical dialog manager may be provided. Upon receiving a spoken query from a user, the query may be categorized according to at least one context clue. The spoken query may then be converted to text according to a statistical dialog manager associated with the category of the query and a response to the spoken query may be provided to the user.

20 Claims, 3 Drawing Sheets

(58) Field of Classification Search
CPC ... G10L 15/1815; G10L 15/183; G10L 15/22; G10L 15/26; G10L 15/265; G10L 2015/00; G10L 2015/063; G10L 2015/08; G10L 2015/22; G10L 2015/223; G10L 2015/225; G10L 2015/228

USPC .............................. 704/9, 10, 255, 257, 235

See application file for complete search history.

(56) References Cited

U.S. PATENT DOCUMENTS

| | | | |
|---|---|---|---|
| 7,257,531 B2 | 8/2007 | Holub | |
| 7,328,155 B2* | 2/2008 | Endo | G10L 15/08 704/251 |
| 7,331,036 B1* | 2/2008 | Hambleton | G10L 15/22 379/88.01 |
| 7,620,628 B2 | 11/2009 | Kapur et al. | |
| 7,809,562 B2 | 10/2010 | Hanazawa | |
| 7,809,565 B2 | 10/2010 | Coifman | |
| 7,890,326 B2 | 2/2011 | Strope et al. | |
| 7,912,700 B2 | 3/2011 | Bower et al. | |
| 8,239,366 B2 | 8/2012 | Sejnoha | |
| 8,260,615 B1 | 9/2012 | Nakajima et al. | |
| 8,352,245 B1 | 1/2013 | Lloyd | |
| 9,318,108 B2 | 4/2016 | Gruber et al. | |
| 9,576,573 B2 | 2/2017 | Bodell et al. | |
| 2002/0032564 A1 | 3/2002 | Ehsani | |
| 2002/0087309 A1* | 7/2002 | Lee | G06Q 30/06 704/240 |
| 2003/0149561 A1* | 8/2003 | Zhou | G10L 15/26 704/240 |
| 2005/0038657 A1* | 2/2005 | Roth | G10L 15/19 704/260 |
| 2005/0043940 A1* | 2/2005 | Elder | G06F 17/3043 704/9 |
| 2005/0288935 A1* | 12/2005 | Lee | G10L 15/26 704/270 |
| 2006/0074660 A1 | 4/2006 | Waters | |
| 2006/0235694 A1* | 10/2006 | Cross | G06F 16/95 704/270.1 |
| 2007/0081428 A1 | 4/2007 | Malhotra et al. | |
| 2007/0294084 A1 | 12/2007 | Cross | |
| 2008/0177541 A1* | 7/2008 | Satomura | 704/251 |
| 2009/0030697 A1* | 1/2009 | Cerra | G10L 15/30 704/275 |
| 2009/0055174 A1 | 2/2009 | Han et al. | |
| 2009/0094033 A1 | 4/2009 | Mozer et al. | |
| 2009/0112586 A1* | 4/2009 | Williams | G10L 15/01 704/239 |
| 2009/0228270 A1* | 9/2009 | Odell | G10L 15/1815 704/231 |
| 2009/0254346 A1* | 10/2009 | Moore | G10L 15/265 704/260 |
| 2010/0299136 A1* | 11/2010 | Tong | G06F 17/279 704/9 |
| 2010/0312555 A1* | 12/2010 | Plumpe | G10L 15/065 704/231 |
| 2011/0054898 A1 | 3/2011 | Phillips et al. | |
| 2011/0144999 A1* | 6/2011 | Jang | G06K 9/00892 704/270.1 |
| 2011/0161081 A1* | 6/2011 | Ballinger | G10L 15/30 704/245 |
| 2011/0295590 A1 | 12/2011 | Lloyd et al. | |
| 2011/0307250 A1* | 12/2011 | Sims | G10L 15/22 704/231 |
| 2012/0136870 A1 | 5/2012 | Joshi | |
| 2012/0191448 A1* | 7/2012 | Lloyd | H04M 1/04 704/231 |
| 2012/0232885 A1* | 9/2012 | Barbosa | G06F 17/2715 704/9 |
| 2014/0039888 A1 | 2/2014 | Taubman | |

OTHER PUBLICATIONS

Article entitled "Speech Recognition Grammar Specification Version 1.0," by W3C, Mar. 16, 2004; can be viewed at http://www.w3.org/TR/speech-grammar/; 65 pages.

U.S. Appl. No. 13/219,891, Office Action dated Mar. 14, 2013, 21 pgs.

U.S. Appl. No. 13/219,891, Amendment and Response filed Jul. 15, 2013, 12 pgs.

U.S. Appl. No. 13/219,891, Office Action dated Sep. 4, 2013, 26 pgs.

U.S. Appl. No. 13/219,891, Amendment and Response filed Feb. 3, 2014, 13 pgs.

U.S. Appl. No. 13/219,891, Office Action dated Jul. 20, 2015, 31 pgs.

U.S. Appl. No. 13/219,891, Amendment and Response filed Nov. 20, 2015, 13 pgs.

U.S. Appl. No. 13/219,891, Office Action dated Jan. 21, 2016, 31 pgs.

U.S. Appl. No. 13/219,891, Amendment and Response filed Apr. 14, 2016, 14 pgs.

U.S. Appl. No. 13/219,891, Notice of Allowance dated Oct. 7, 2016, 11 pgs.

U.S. Appl. No. 13/219,891, Amendment after Allowance filed Jan. 2017, 7 pgs.

U.S. Appl. No. 13/219,891, USPTO Response dated Jan. 25, 2017, 2 pgs.

* cited by examiner

USING MULTIPLE MODALITY INPUT TO FEEDBACK CONTEXT FOR NATURAL LANGUAGE UNDERSTANDING

CROSS-REFERENCE TO RELATED APPLICATIONS

This application is a continuation of and claims priority to application Ser. No. 13/219,891, now U.S. Pat. No. 9,576,573, filed Aug. 29, 2011, entitled USING MULTIPLE MODALITY INPUT TO FEEDBACK CONTEXT FOR NATURAL LANGUAGE UNDERSTANDING, which is hereby incorporated by reference in its entirety. To the extent appropriate, the present application claims priority to the above-referenced application.

BACKGROUND

Web page context may be used to assist spoken language understanding (SLU) applications. In conventional systems, recognizing speech and natural understanding processing needs some sort of grammars or context information. In speech recognition this is usually domain specific rule based grammars, such as Speech Recognition Grammar Systems (SRGS), or statistical language models, such as n-grams. In some situations, however, incoming speech may not be categorized, so wide-ranging statistical models must be used rather than tightly focused ones that may better recognize and respond to spoken queries.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Input context for a statistical dialog manager may be provided. Upon receiving a spoken query from a user, the query may be categorized according to at least one context clue. The spoken query may then be converted to text according to a statistical dialog manager associated with the category of the query and a response to the spoken query may be provided to the user.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
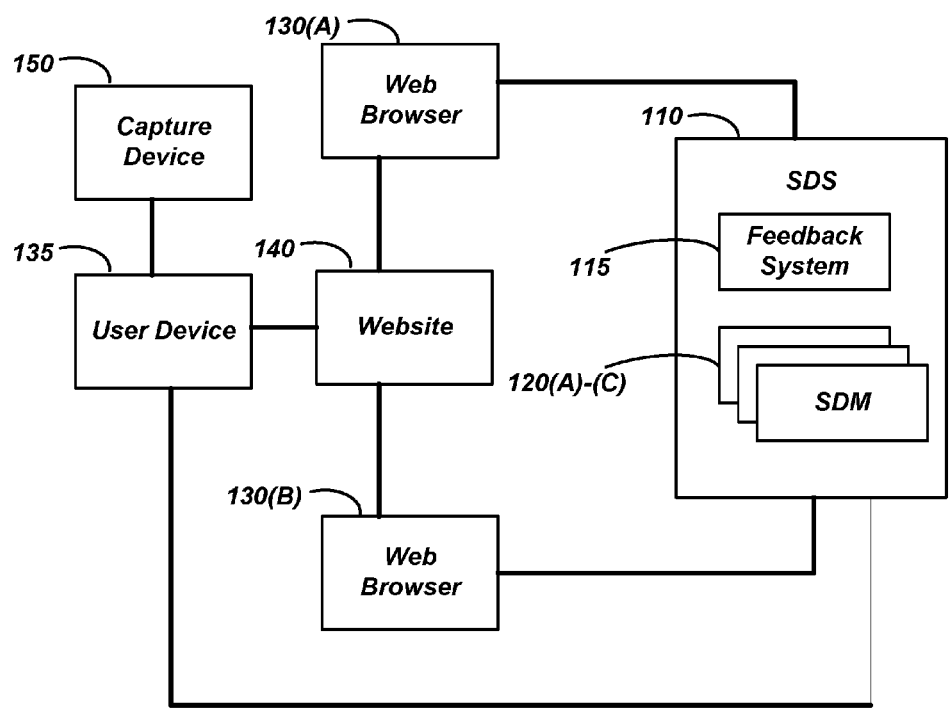
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Consistent with embodiments of the invention, spoken dialogs may be mapped from text/click searches and browser interactions. The goals/tasks and sequence of steps taken to complete the goals/tasks may be similar whether completed with a web browser or via a spoken dialog system, although the manifestation of the user's desired actions is different. To address this mismatch, the dialog modeling problem may be separated into two parts: (1) building statistical models associated with categories of queries, and (2) applying the categorized statistical models to queries known to be associated with the appropriate category.

A web browser may make note of what data is input into various input items and selectors on each page and then submit that information to a feedback system complete with the context of the page and other metadata (timestamp, user id, etc.). The data may be submitted as it is entered in real time (e.g., an AJAX request on each keystroke) and/or may be batched up and sent in periodically (e.g., every 5 minutes or whenever the browser is opened or closed). The information then enters the feedback system and is processed. For example, an input item with the name "movie title" may typically end up with only a few hundred entries as the entry by ~80+% of users. The feedback system may then—through either supervised or unsupervised machine learning—associate those few hundred titles as high probability words when the input item name is movie title. Now in the future, when a web browser is browsing an additional page with an input item with the name "movie title", a natural language service may update its statistical language models and/or rule based grammars to upweight these few hundred titles and thereby achieve better accuracy in its recognition.

For another example, the feedback system may associate requests that are made on pages in the domain name of "espn.com" with a few different categories of words and the top 90+% of words in those categories (i.e., categories: sports, team names, player names, matches, espn article authors). Categories associated within the sports domain may include sports (e.g., baseball, football, golf, hockey, etc.), team names (e.g., Yankees, Redskins, Thunder, Bruins, etc.), player names, etc. The feedback system may learn that these are the sorts of things a user is likely to say while browsing a page on the espn.com domain.

FIG. 1 is a block diagram of an operating environment 100 for providing input context for natural language understanding comprising a spoken dialog system (SDS) 110. SDS 110 may comprise a feedback system 115 and a plurality of statistical dialog managers (SDMs) 120(A)-(C). SDS 110 may be operative to interact with a plurality of web browsers 130(A)-(B) and/or a user device 135, such as with respect to their interactions with a website 140. User device 135 may comprise an electronic communications device such as a computer, laptop, cell phone, tablet, game console and/or other device. User device 135 may be coupled to a capture device 150 that may be operative to record a user and capture spoken words, motions and/or gestures made by the user, such as with a camera and/or microphone. User device 130 may be further operative to capture other inputs from the user such as by a keyboard, touchscreen and/or mouse (not pictured). Consistent with embodiments of the invention, capture device 150 may comprise any speech and/or motion detection device capable of detecting the actions of the user. For example, capture device 150 may comprise a Microsoft® Kinect® motion capture device comprising a plurality of cameras and a plurality of microphones.

Figure 2:
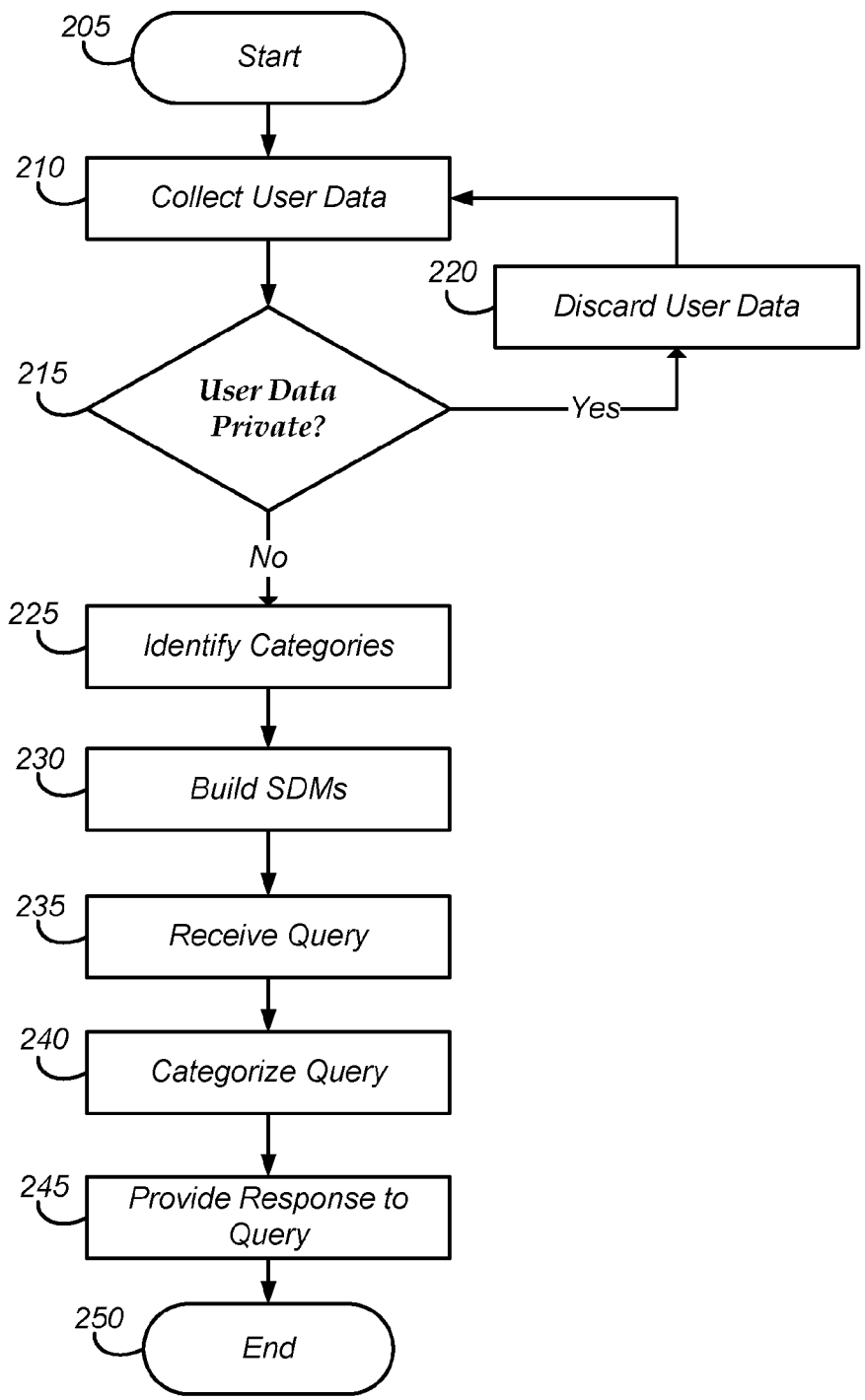
FIG. 2 is a flow chart of a method for providing input context for natural language understanding.

FIG. 2 is a flow chart setting forth the general stages involved in a method 200 consistent with an embodiment of the invention for providing statistical dialog manager training. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may collect a plurality of user data. For example, SDS 110 may mine through a plurality of web session log data associated with a search engine.

Method 200 may then advance to stage 215 where computing device 300 may determine whether at least one element of the plurality of user data comprises a private data element. For example, a element in the session data may comprise an input element labeled "SSN" associated with a social security number input.

Method 200 may then advance to stage 220 where computing device 300 may, in response to determining that the element does comprise private data, discard the element. For example, all data in the "SSN" field may be discarded. Consistent with embodiments of the invention, actual inputs to the field may be anonymized by identifying that the inputs to the field always comprise numbers and thus providing a higher statistical weighting to individual numbers (e.g., "one", "two", "three", . . . ) without compromising actual social security number data. Once the data is discarded, method 200 may return to the collection of data at stage 210.

Method 200 may proceed with valid data to stage 225 where computing device 300 may identify a plurality of categories associated with the plurality of user data. For example, session data associated with the "espn.com" domain may be generally categorized as "sports" and may be further subcategorized as "teams", "players", "activities", etc.

Method 200 may then advance to stage 230 where computing device 300 may build a plurality of statistical dialog managers, each of which may be associated with one of the plurality of categories. For example, a "teams" subcategory SDM may weight team names and cities as statistically more likely than non-team name words and city names.

Method 200 may then advance to stage 235 where computing device 300 may receive a spoken user query via a web browser application in communication with a web page. For example, a web browser open to "espn.com" may receive spoken input via a microphone of "what was the score in last night's Braves game".

Method 200 may then advance to stage 240 where computing device 300 may categorize the spoken user query according to at least one context clue provided by the web browser. Such context clues may comprise, for example, a domain name, an input field name, an input field name, other page elements, a profile associated with the user, a previous query, and a user-inputted value associated with a second input field. For example, when the query "what was the score in last night's Braves game" is received, the "espn.com" domain may provide a context clue that the category is "sports", while other elements on the page, such as a list of "MLB" scores may provide a context clue that "baseball" is a subcategory of the query. Alternately, user profile data may indicate that the user is in Atlanta, giving resulting in an "Atlanta" category SDM being selected and used to identify the spoken query as referring to Atlanta's baseball team.

Method 200 may then advance to stage 240 where computing device 300 may provide a response to the spoken user query. For example, the query may be converted to text via the statistical dialog manager and applied to a search engine application. The results from the search engine may then be displayed and/or read out to the user. Method 200 may then end at stage 250.

An embodiment consistent with the invention may comprise a system for providing statistical dialog manager training. The system may comprise a memory storage and a processing unit coupled to the memory storage. The processing unit may be operative to receive a spoken query from a user, categorize the spoken query according to at least one context clue, converting the spoken query to text according to a statistical dialog manager associated with the category of the query; and provide a response to the spoken query.

Another embodiment consistent with the invention may comprise a system for providing statistical dialog manager training. The system may comprise a memory storage and a processing unit coupled to the memory storage. The processing unit may be operative to receive a plurality of user data, identify a plurality of categories associated with the plurality of user data, build a plurality of statistical dialog managers, wherein each of the plurality of statistical dialog managers is associated with one of the plurality of categories, receive a user query, categorize the user query, and provide a response to the user query via the statistical dialog manager associated with the category of the user query. The processing unit may be further operative to aggregate and/or anonymize the plurality of user data from a plurality of users. For example, the user data may comprise session logs associated with a web form aggregated to collect multiple users' responses to a given input element. The input may be scanned to determine whether the users' inputs may comprise personal data (e.g., social security numbers, birthdates, security question answers, etc.) Such personal data may be stripped out of the aggregated data in order to avoid compromising the users' privacy.

Yet another embodiment consistent with the invention may comprise a system for providing statistical dialog manager training. The system may comprise a memory storage and a processing unit coupled to the memory storage. The processing unit may be operative to collect a plurality of user data associated with a web page, discard any private data elements, identify a plurality of categories associated with the plurality of user data, and build a plurality of statistical dialog managers, wherein each of the plurality of statistical dialog managers is associated with one of the plurality of categories. Upon receiving a spoken user query, such as via a web browser application in communication with a web page, the processing unit may be operative to categorize the spoken user query according to at least one context clue provided by the web browser convert the categorized spoken user query to text via the statistical dialog manager associated with the category of the spoken user query, apply the converted query to a search engine, and provide a response to the spoken user query according the statistical dialog manager associated with the category of the user query via the web browser application.

Figure 3:
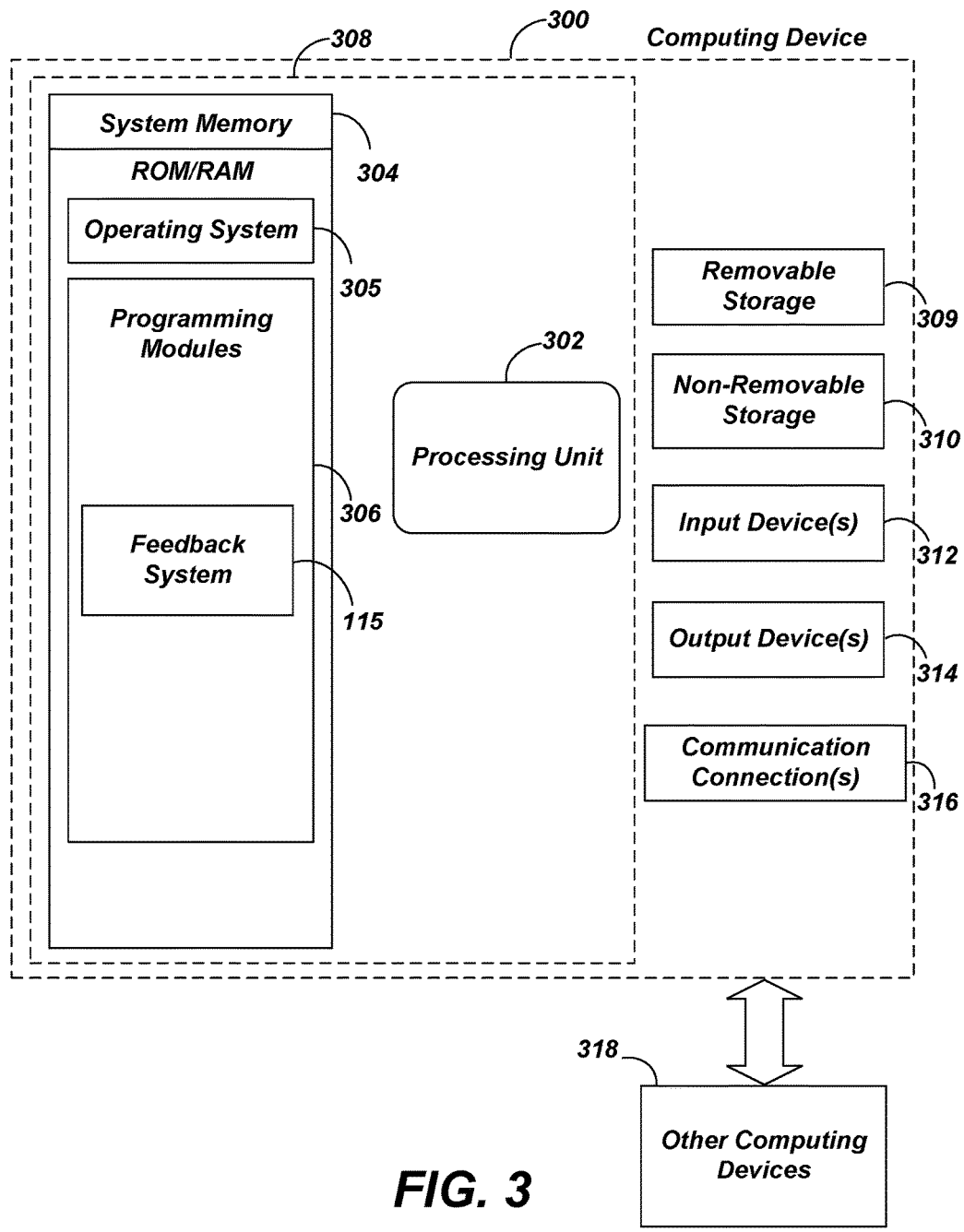
FIG. 3 is a block diagram of a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise operating environment 300 as described above. Methods described in this specification may operate in other environments and are not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include feedback system 115. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g., feedback system 115) may perform processes and/or methods as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with SDS 110 may operate via application-specific logic integrated with other components of the computing device/system X on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A computer-implemented method for recognizing speech, the method comprising:
    receiving a spoken query for a first input field;
    identifying a category for the spoken query based on at least a user-inputted value associated with a second input field;
    converting the spoken query to text according to a statistical dialog manager of a spoken dialog system of a computerized natural language service, the statistical dialog manager associated with the identified category and utilized to statistically weight terms belonging to the identified category; and
    providing a response to the spoken query.

2. The method of claim 1, wherein the first input field and the second input field are displayed in a web page and the spoken query is associated with the web page.

3. The method of claim 2, wherein providing the response to the spoken query comprises:
    performing a function associated with the web page; and
    returning at least one result of performing the function.

4. The method of claim 3, further comprising providing the response as a spoken response via a text to speech conversion.

5. The method of claim 1, further comprising identifying a subcategory of the category based on at least one of the following: a previous query with respect to the spoken query, a domain name for a webpage containing the first input field and the second input field.

6. The method of claim 1, further comprising providing the converted spoken text query to a web browser.

7. The method of claim 6, wherein the statistical dialog manager executes on a server communicatively coupled to the web browser via a network.

8. The method of claim 1, wherein the identification of the category for the spoken query is based on both the name of a first input field and the user-inputted value associated with the second input field.

9. The method of claim 1, wherein the statistical dialog manager executes on the user device.

10. A system for providing input context to a speech recognizer, the system comprising:
    at least one processor; and
    a memory operatively connected to the at least one processor, the memory storing instructions that when executed by the at least one processor perform a set of operations comprising:
    receiving a spoken query for a first input field;
    identifying a category for the spoken query based on a user-inputted value entered into a second input field;
    converting the spoken query to text according to a statistical dialog manager of a spoken dialog system of a computerized natural language service, the statistical dialog manager associated with the category and utilized to statistically weight terms belonging to the category; and providing a response to the spoken query.

11. The system of claim 10, wherein the first input field is displayed in a web page and the spoken query is associated with the web page.

12. The system of claim 11, wherein providing the response to the spoken query comprises:

performing a function associated with the web page; and returning at least one result of performing the function.

13. The system of claim 10, wherein the operations further comprise identifying a subcategory of the category based on a domain name for a webpage containing the first input field and the second input field.

14. The system of claim 10, wherein the identification of the category for the spoken query is further based on a previous spoken query.

15. The system of claim 10, wherein identifying the category is further based on user profile data for a user providing the spoken query.

16. The system of claim 15, wherein the user profile data includes a location of a user.

17. A storage device, having computer-executable instructions that, when executed by at least one processor, perform a method receiving spoken input, the method comprising:

analyzing contextual data associated with a web page, wherein the plurality of contextual data comprises a plurality of inputs and responses associated with an interactive form of the web page;

based on the analysis, determining a plurality of categories comprising a category and one or more subcategories of the category;

building a plurality of statistical dialog managers, wherein a first statistical dialog manager in the plurality of statistical dialog managers is associated with the category and at least one additional statistical dialog manager in the plurality of statistical dialog managers is associated with each of the one or more subcategories;

receiving a spoken user input via a web browser application in communication with the web page;

categorizing the spoken user input according to at least one of a name of a first input field and a user-inputted value associated with a second input field;

determining a subcategory for the spoken user input;

converting the categorized spoken user input to text via the first statistical dialog manager associated with the category of the spoken user input and the at least one additional statistical dialog manager associated with the one or more subcategories, wherein the subcategory is based on additional page elements within the web page; and applying the converted spoken user input to a web page element.

18. The storage device of claim 17, wherein determining the subcategory is based on at least one of a previous query and a domain name for the web page.

19. The storage device of claim 18, wherein categorizing the spoken user input is further based on user profile data for a user providing the spoken user input.

20. The storage device of claim 17, wherein applying the converted spoken user input includes adding the spoken user input into the first input field.

* * * * *